US007228499B1

(12) United States Patent
Taira

(10) Patent No.: US 7,228,499 B1
(45) Date of Patent: Jun. 5, 2007

(54) PROCESSOR WITH SEPARATELY CONFIGURED DISPLAY CONTROL FILE, CGI SCRIPTS, AND PROCESSING PROGRAM

(75) Inventor: Yasuhito Taira, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 911 days.

(21) Appl. No.: 09/704,558

(22) Filed: Nov. 3, 2000

(30) Foreign Application Priority Data

Feb. 29, 2000 (JP) ............................. 2000-054114

(51) Int. Cl.
*G06F 17/00* (2006.01)
(52) U.S. Cl. ................... 715/517; 715/501.1; 715/513; 709/203; 709/218
(58) Field of Classification Search ................ 715/517, 715/513, 500, 501.1; 709/203, 218, 246; 705/27; 719/311; 713/201
See application file for complete search history.

(56) References Cited

U.S. PATENT DOCUMENTS

| 5,835,712 | A | * | 11/1998 | DuFresne ................... 709/203 |
| 5,892,905 | A |   | 4/1999  | Brandt et al. |
| 5,905,973 | A | * | 5/1999  | Yonezawa et al. ............ 705/27 |
| 6,012,098 | A | * | 1/2000  | Bayeh et al. ................ 709/246 |
| 6,014,638 | A | * | 1/2000  | Burge et al. ................... 705/27 |
| 6,023,714 | A | * | 2/2000  | Hill et al. ..................... 715/513 |
| 6,185,600 | B1 | * | 2/2001  | Spence et al. ............. 709/203 |
| 6,301,590 | B1 | * | 10/2001 | Siow et al. .................. 715/500 |
| 6,308,275 | B1 | * | 10/2001 | Vaswani et al. ............ 713/201 |
| 6,549,952 | B1 | * | 4/2003  | Plassmann et al. ......... 719/311 |
| 6,668,354 | B1 | * | 12/2003 | Chen et al. .................. 715/517 |
| 2002/0156835 | A1 | * | 10/2002 | Williams et al. ............ 709/203 |

FOREIGN PATENT DOCUMENTS

JP          10-105499           4/1998

(Continued)

OTHER PUBLICATIONS

Wikipedia definition, "NCSA HTTPd", Copyright Apr. 4, 2006, http://en.wikipedia.org/wiki/NCSA_HTTPd 1 page.*

(Continued)

*Primary Examiner*—Heather R. Herndon
*Assistant Examiner*—James Blackwell
(74) *Attorney, Agent, or Firm*—Westerman, Hattori, Daniels & Adrian, LLP.

(57) ABSTRACT

In a source file for a server, a Web display control division, a CGI script division and a processing program division are separated.

The server has a Web server division, a CGI script control division and a processing program division and constitutes an interactive system together with an operation terminal unit in which inputs are made through a Web browser. A display control file describing Web page control information is provided for each Web page to be displayed, and the CGI script control division analyzes the description of the said display control file designated by said Web browser, executes said processing program following the description and outputs the result of the processing from Web server division to said Web browser. The name of processing programs activated for collection of information for the display of a Web page and control of the system and a method for displaying the result of such processing on the Web page are described in a script format in the display control file.

4 Claims, 14 Drawing Sheets

FOREIGN PATENT DOCUMENTS

| | | |
|---|---|---|
| JP | 10-247183 | 9/1998 |
| JP | 2000-47966 A | 2/2000 |

OTHER PUBLICATIONS

HTTPd Home Page, "NCSA HTTPd", Copyright Jan. 21, 1998, Univ. of Ill. Urbana-Champaigne, 2 pages.*

Wikipedia Definition, "Web Server", Copyright Jun. 3, 2006 6 pages.*

CaribouLake, "Comparison of JDBC and Java to HTML/CGI", Copyright May 3, 1998, Caribou Lake Software 3 pages.*

Miyagawa et al., "WWW System", Full English Translation of JP 2000047966 A, 21 pages total.*

Japanese Office Action 2000-054114 dated May 23, 2006.

Office Action issued in corresponding Japanese Patent Application No.: 2000-054114 dated Dec. 26, 2006.

* cited by examiner

--PRIOR ART--

Fig.2D (USER REGISTRATION DISPLAY)

USER REGISTRATION

USER NAME :
PASSWORD :
RE-ENTRY OF PASSWORD :

REGISTER

RETURN TO IMMEDIATELY PREVIOUS DISPLAY

RETURN TO THE SYSTEM MANAGEMENT DISPLAY

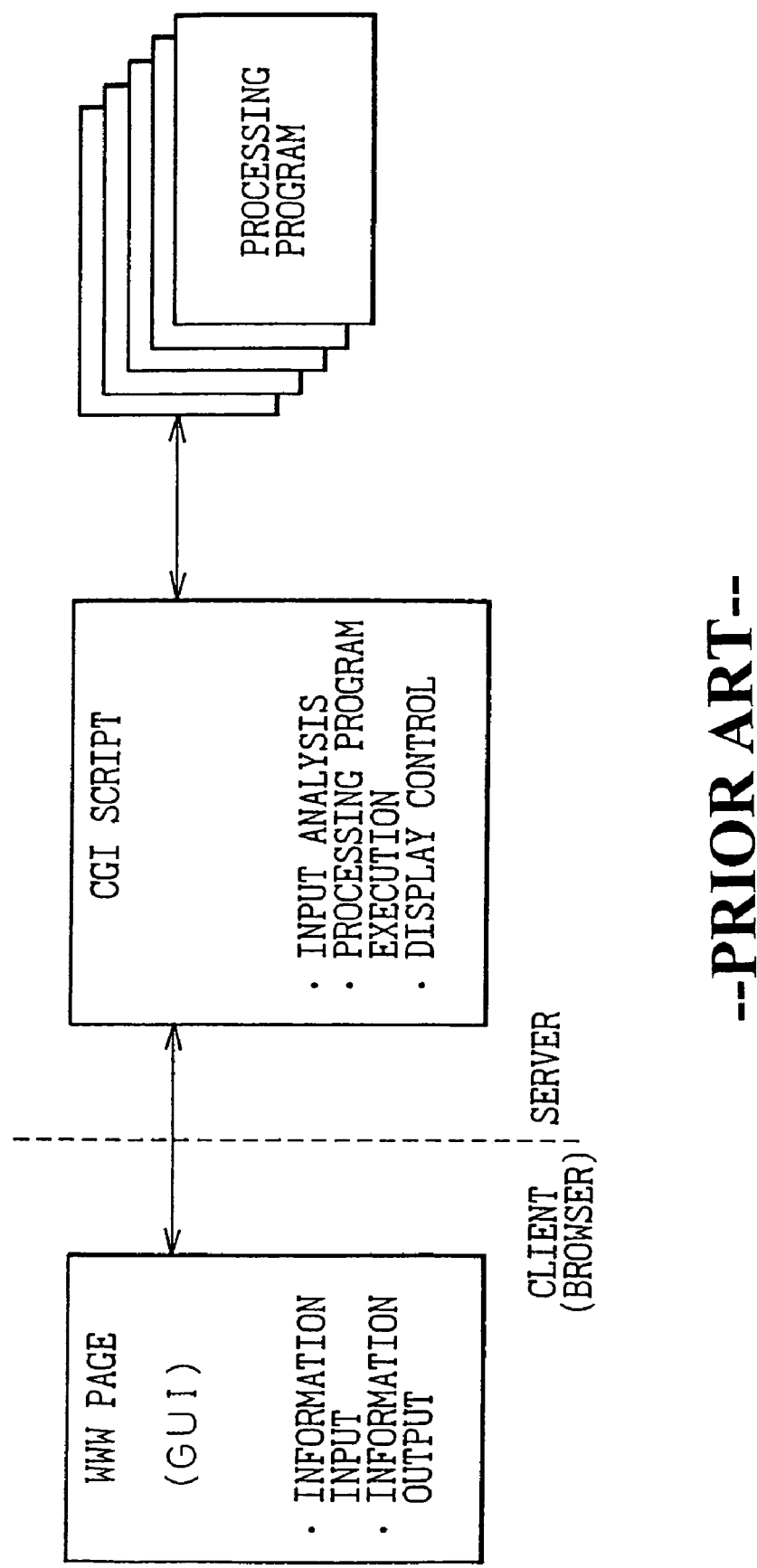

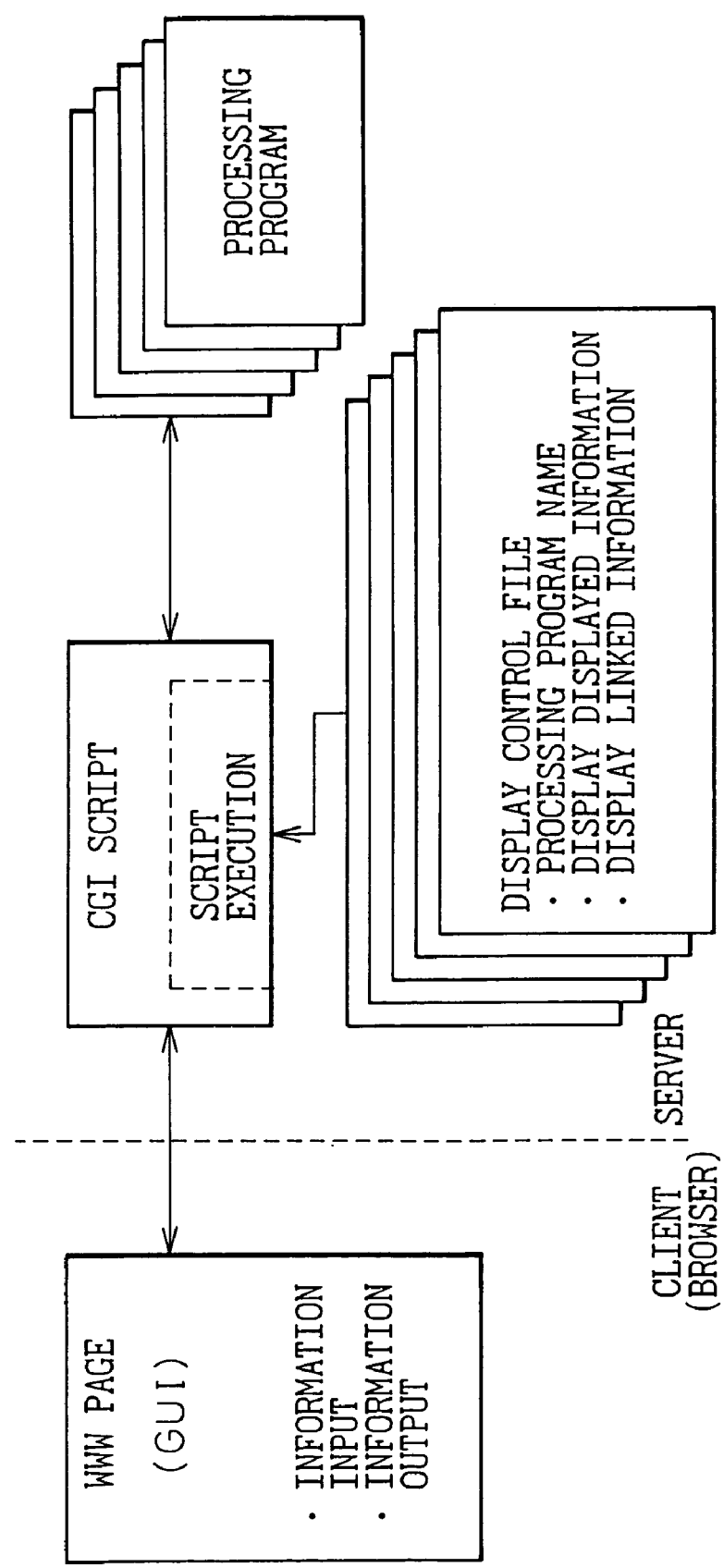

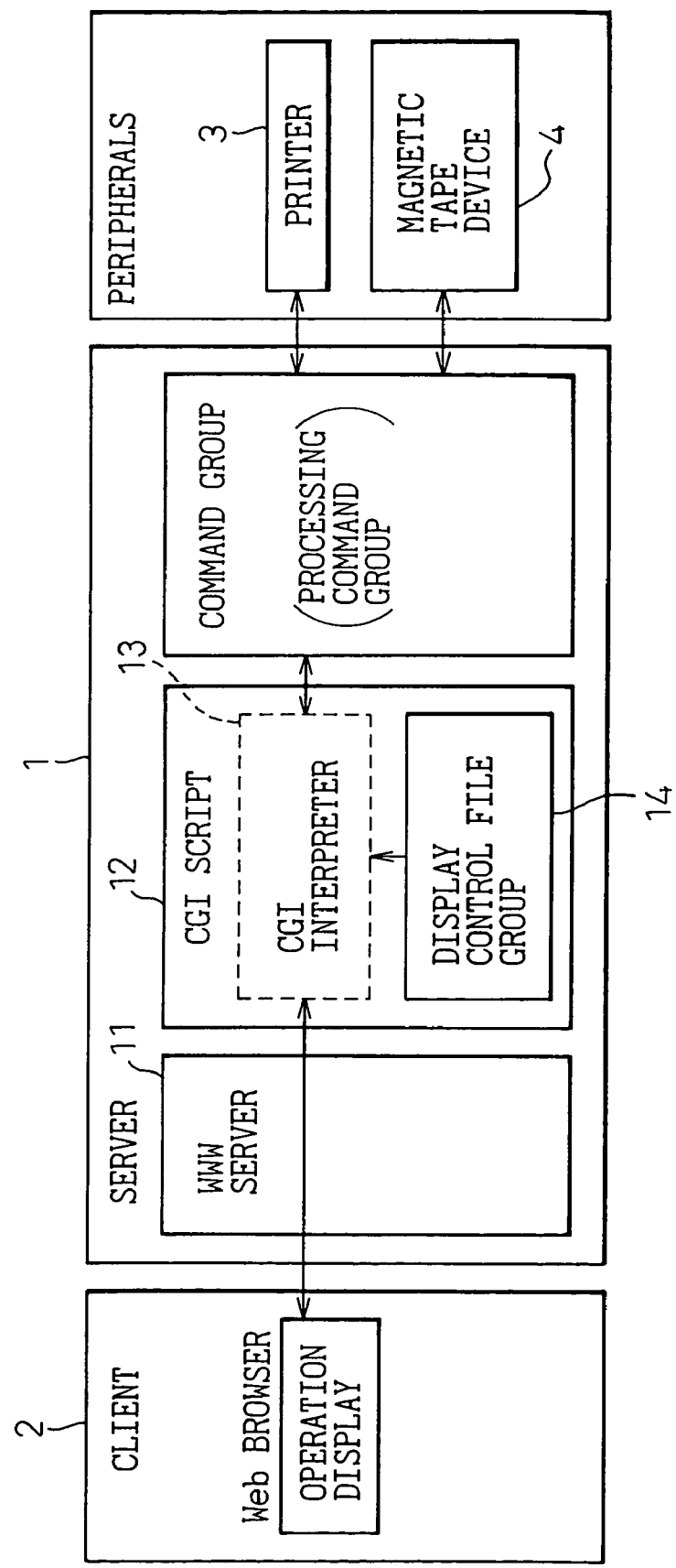

Fig.6

```
       【FILE CONTROL DIVISION】
         (DESCRIBE A UNIQUE SCRIPT)

(a)  command   xxxxxxxxxx
(b)  switch    $NPS_CMD_1
(c)     1   goto xxxxxxxxx
        2   goto xxxxxxxxx
     end (d)  error    xxxxxxxxxx
       【HTML DIVISION】
         (DESCRIBE HTML,JavaScript)
         <html>

(e)  $NPS_switch   $NPS_CGI_para
(f)     1
        2
     end

</html>
```

Fig.10

```
# DISPLAY CONTROL FILE NAME: sysUserRegisterComplete
# SUMMARY                  : DISPLAY USER REGISTRATION COMPLETION DISPLAY
# REMARKS                  :

# AUTHORIZATION CHECK
authorize  manager

# USER REGISTRATION
command  npsusermanager
# ABNORMAL PROCESSING
error  sysUserRegister

[htmlStart]

<html>
<head>
<title> SYSTEM MANAGEMENT </title>
<meta http-equiv="Content-Type" content="text/html: charset=x-sjis">
(OMITTED)
        <table width="75%" border="0" cellspacing="0" cellpadding="0">
         <tr valign="bottom" align="center">
           <td height="150" class="screenText13">
 $         USER "$NPS-CGI-u$" HAS BEEN REGISTERED </td>
         </tr>
(OMITTED)
</body>
</html>
```

PROCESSOR WITH SEPARATELY CONFIGURED DISPLAY CONTROL FILE, CGI SCRIPTS, AND PROCESSING PROGRAM

BACKGROUND OF THE INVENTION

1. Field of the Invention

The present invention relates to a processor for an interactive system in which input is made through a web browser of a client and the processing of the input is carried out on a server side, and more particularly to a processor configured so as to separate, for storage, a display control file, related to what is displayed on the screen, in a CGI script from other scripts.

2. Description of the Related Art

There exists a system for executing various processes by connecting various types of devices to each other through a local area network, or LAN, and executing mutual communications between the devices. For example, there is a page printer for offline printing jobs of a large-scale general purpose computer via a magnetic tape or LAN.

In this page printer, a controller and an operation terminal unit such as a personal computer are connected to a LAN connected in turn to host computers. Then, a printer device including a plurality of printers and a magnetic tape device needed for an offline operation are connected to the controller, and the controller can be provided with a flexible system configuration in which the controller can mutually deal with a multiplicity of host computers and can be connected to a plurality of printers.

In this page printer system configuration, the controller functions as a server, while the operation terminal unit as a client. Here, in a case where a world wide web format, or a WWW format, is adopted, the operation terminal unit uses a Web browser.

Interactive processing can be executed by following a Web page displayed on the screen of the operation terminal unit which functions as the client. For example, in a case where a user is registered to use the page printer system, an operator presses required operation buttons while following an operation display appearing on the screen of the operation terminal unit. When the screen displays a user registration display, inputs for user registration are carried out on the display. Thus, a new user is registered on the controller through the operation of the operator, and from then on, the page printer can be used using the registered name of the user.

In this type of page printer, following the interactive system, inputs are made through the Web browser and the server executes required processing in response to the inputs. To make this happen, the controller functioning as the server is provided with a CGI script. The CGI script receives input information inputted from a Web page of the client, analyzes it and activates required processing programs in response to the results of the analysis. Additionally, the CGI script generates and processes a hypertext markup language document, or an HTML document, for the Web page so as to inform the user of the results of the processing and outputs information thereon to the Web browser. Then, in the Web browser, the information so outputted is displayed on the Web page, and the process advances to the following step.

The CGI script provided on the server for the page printer system includes analysis of inputs, execution of processed programs, control of screen and the like. Thus, as the number of Web pages to be displayed on the screen increases, the processing of the CGI script becomes complicated, and therefore the load is increased. Then, in a case where the display of the Web page must be changed with respect to the display design, a change in the description of the CGI script will result.

To cope with this, in order to change a portion of the CGI script in association with the display control, a modifying person needs to know very well the description of the CGI script with respect to the display control, processing programs and the like. Furthermore, even if a part of the CGI script must be changed, in conjunction of a required modification, there may occur a risk of erroneously modifying the description of the CGI script for a portion which should not be modified or, in contrast, there may occur a risk of failing to modify portions which relate to each other with respect to a required modification, and when those problems happen actually, the quality of the system will be affected largely and adversely.

The same thing can be said not only when the portion of the CGI script relating to the display control but also other portions thereof must be changed.

Thus, as has been described above, in the server for the prior art page printer, the CGI script is configured as an integral part, and the description with respect to the Web page control is deeply related to the descriptions with respect to other controls.

The present invention was made in view of these situations, and an object thereof is to provide a CGI script for a server which is configured such that a description for only a display control division can be changed, for example, when only the display control of a Web page is to be changed and whereby, even when another control division is being changed, an operation of changing the display control division can be performed in parallel.

SUMMARY OF THE INVENTION

With a view to solving the aforesaid problems, according to an aspect of the present invention, there is provided a server controller connected to a LAN, adapted to configure an interactive system together with an operation terminal unit to which inputs are made through a Web browser and having at least a Web server division, a CGI script division and a processing program division, the server controller being characterized in that the server controller is configured so as to have a display control file for each Web page which describes web page control information for display on the operation terminal unit, wherein the CGI script control division is configured so as to analyze the control information of the display control file designated by the Web page, to execute and process a processing program in the processing program division and to output results of the execution and process of the process program to the Web browser.

Moreover, in the display control files, the display control information of the Web page is described separately in a file control division and an HTML division.

By configuring the server controller as described above, names of processing programs to be activated for collection of information to display the Web pages and system control and methods for displaying results of the processing on the Web pages can be described in the display control files in the form of scripts, whereby the Web display control division, the CGI script division and the processing program division can clearly separated.

BRIEF DESCRIPTION OF THE DRAWINGS

FIGS. 2A to 2E show specific screen views displaying Web pages on an operation terminal unit, FIG. 3 is a schematic diagram showing the configuration of a CGI script in a prior art server, FIG. 4 is a schematic diagram explaining the configuration of a CGI script in a server according to the present invention, FIG. 5 is a diagram explaining the system configuration of a server according to an embodiment of the present invention, FIG. 6 is a diagram showing a specific example of the configuration of a display control file in the embodiment of the present invention, FIG. 10 is a diagram showing a specific example of description on the display control file in relation to the registration of a user

DESCRIPTION OF THE PREFERRED EMBODIMENT

Before describing embodiments of the present invention, the related art and disadvantages thereof will be described with reference to the related figures.

Figure 1:
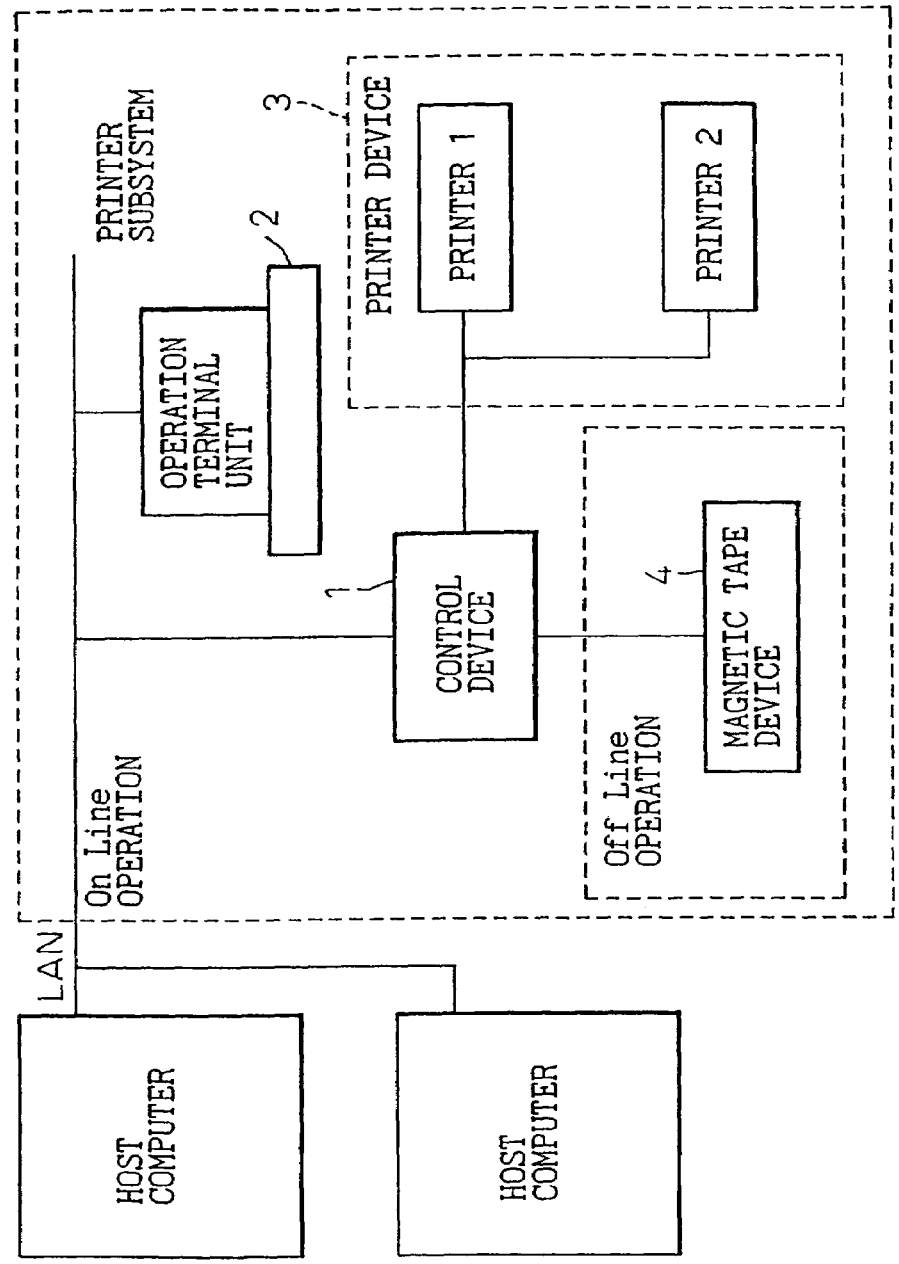
FIG. 1 is a schematic block diagram showing the configuration of a page printer system.

In a page printer system shown in FIG. 1, a controller 1 and an operation terminal unit 2 such as a personal computer are connected to a LAN connected in turn to host computers. Then, a printer device 3 including a plurality of printers 1, 2 and a magnetic tape device 4 needed for an offline operation are connected to the controller 1, and the controller 1 can be provided with a flexible system configuration in which the controller 1 can mutually deal with a multiplicity of host computers and can be connected to a plurality of printers.

Specific examples of screen displays are shown in FIGS. 2A to 2E, an interactive process is executed by using Web pages displayed on the screen of the operation terminal unit 2, which is on a client side. The specific display examples shown in FIGS. 2A to 2E describe, for example, a case where a user is registered to use the page printer system, and Web pages that are to be displayed on the screen of the operation terminal unit 2 in operational sequence are shown. Operations described therein are those needed when a system manager registers a new user who uses the system.

In a system like this, an operator performs operations required for registering a user following operation displays shown in FIGS. 2A to 2E that are displayed on the operation terminal unit 2.

Figure 2A:
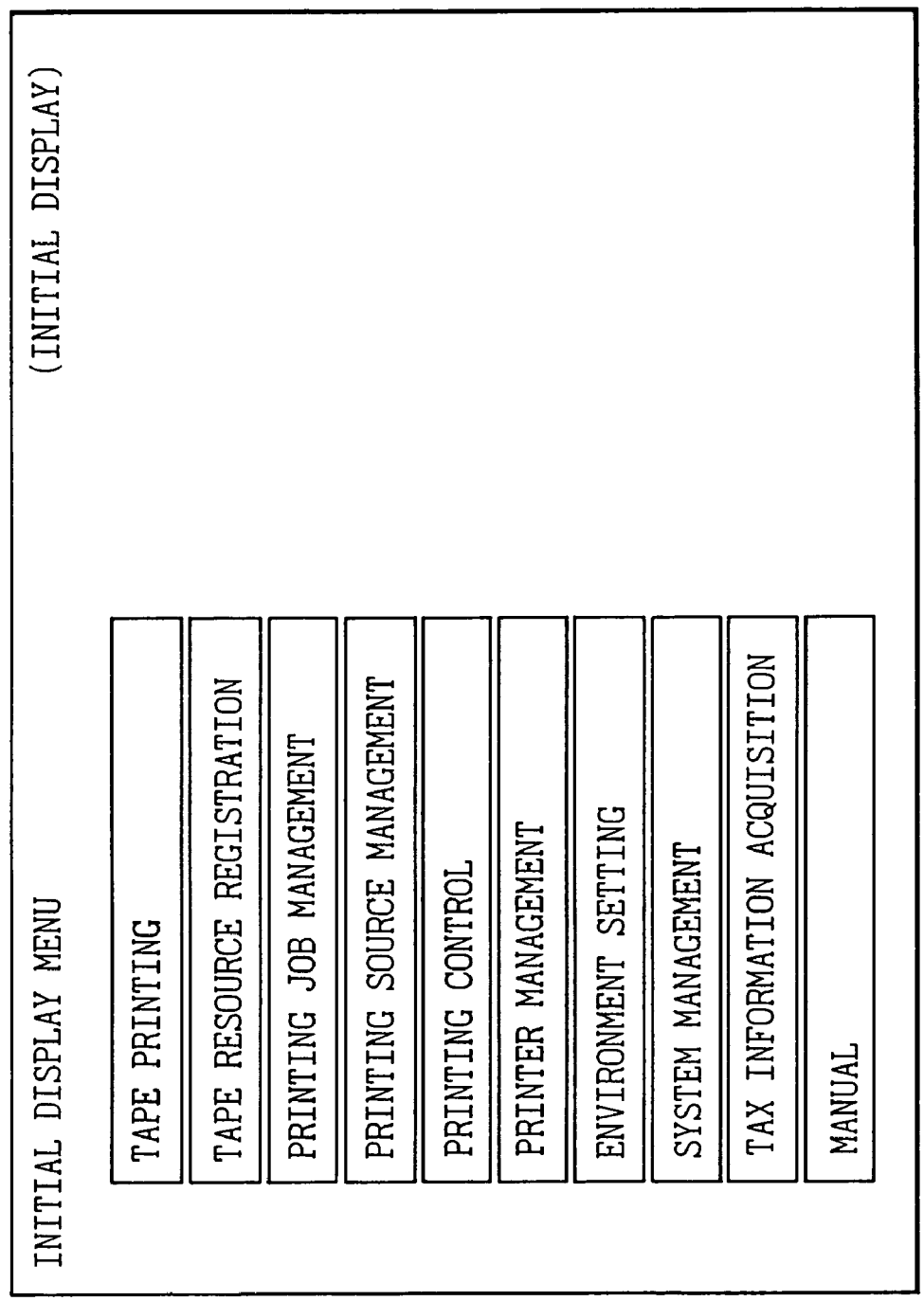
Figure 2B:
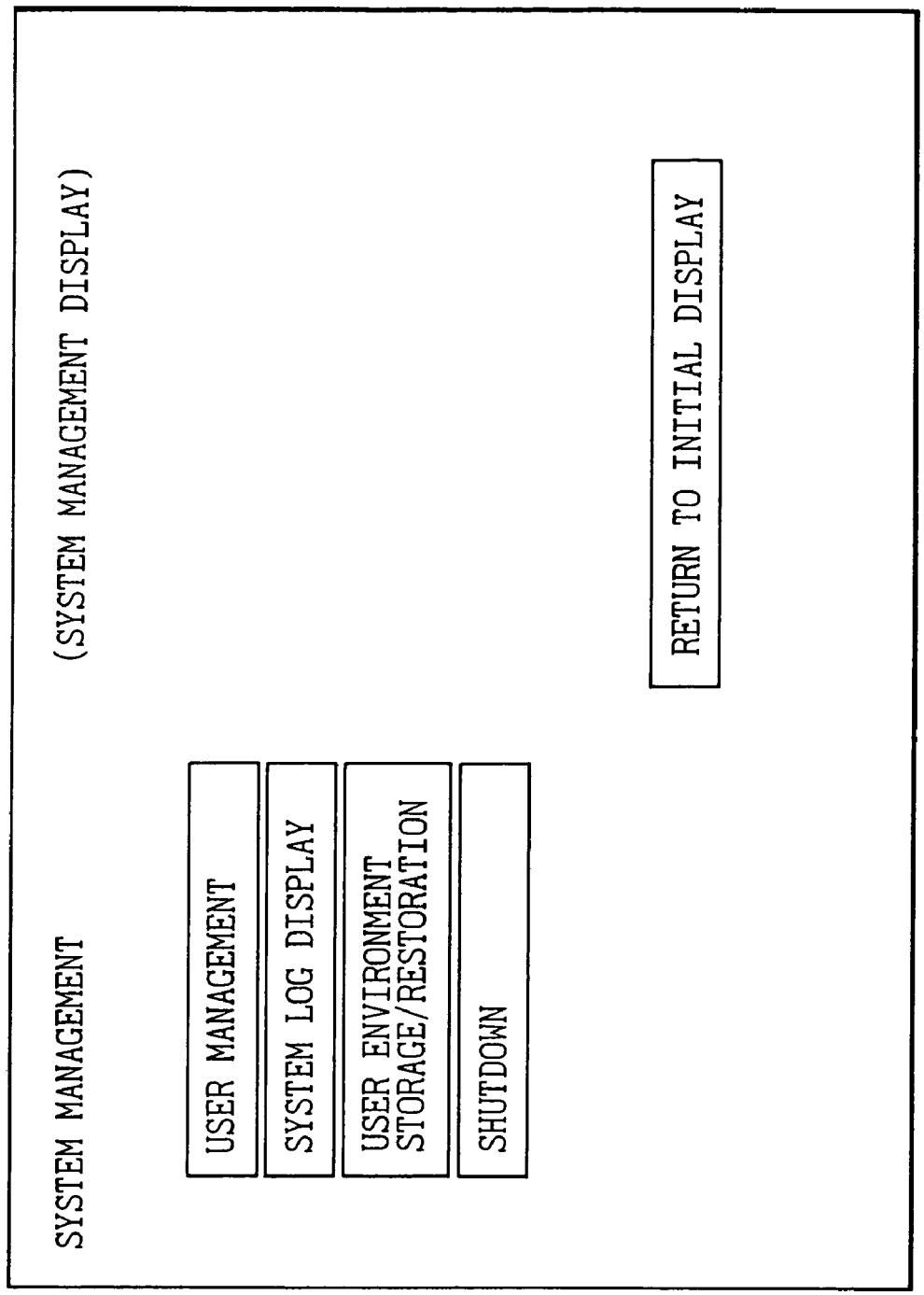

An initial display shown in FIG. 2A is displayed on the Web browser. An operation menu is displayed on this initial display which is required to execute the page printer system (in the following figures explaining the displays, only portions depending on the respective functions will be shown and other displays will be omitted). In the figure, for example, the "tape printing" denotes a menu for executing printing from the magnetic tape device, and the "tape resource registration" denotes a menu for executing the acquisition of printing resources from the magnetic tape device to the controller.

Here, the operator selects and presses a button for "system management" from the menu displayed on the screen. Then, the screen changes to a main display of the system management shown in FIG. 2B.

Figure 2C:
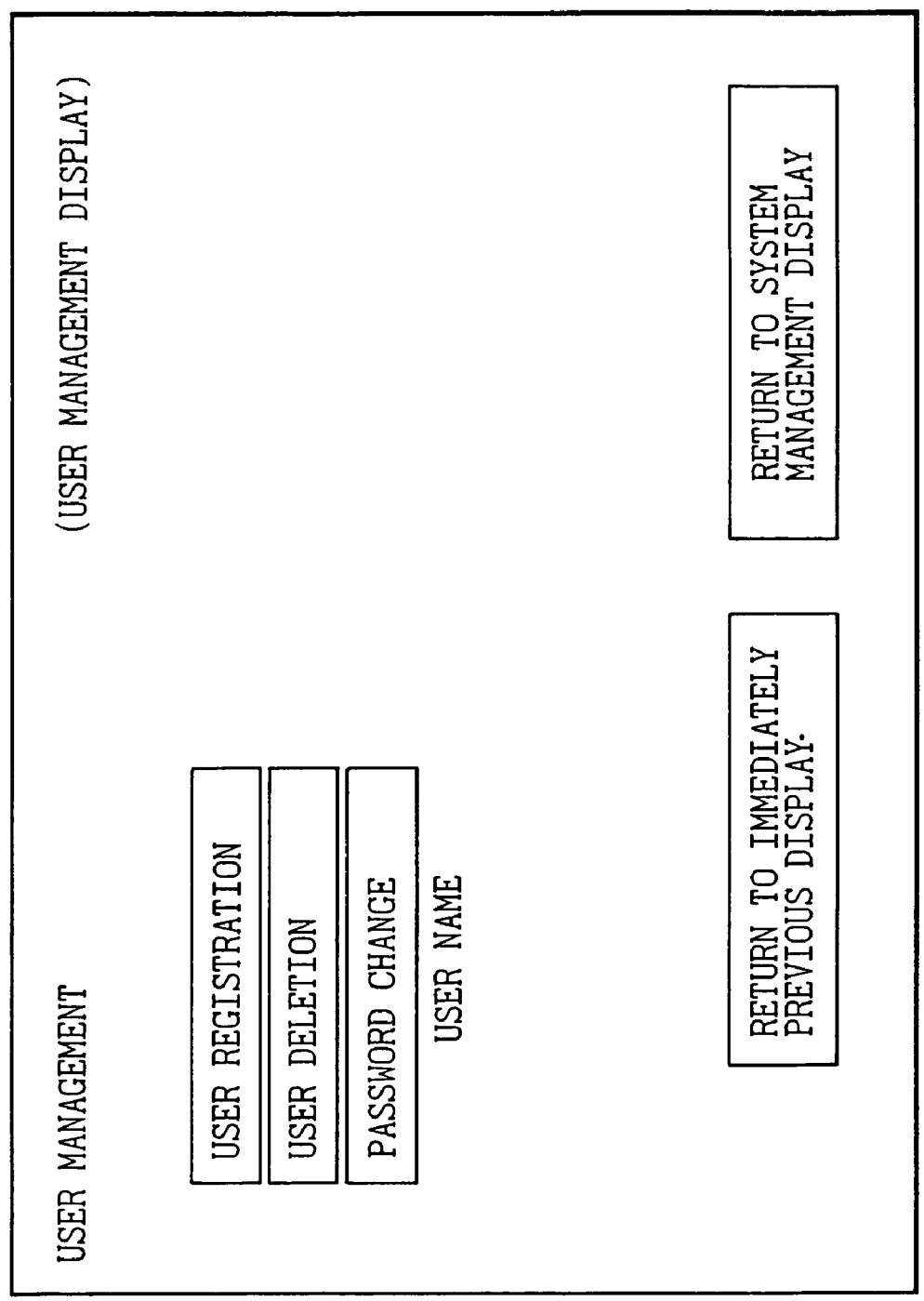

An operation menu required for the system management is shown on this main display. When a "user management" button among operation buttons displayed thereon is pressed, a user management display shown in FIG. 2C is displayed, and further when a "user registration" button is pressed, then the screen changes to a user registration display.

Figure 2E:
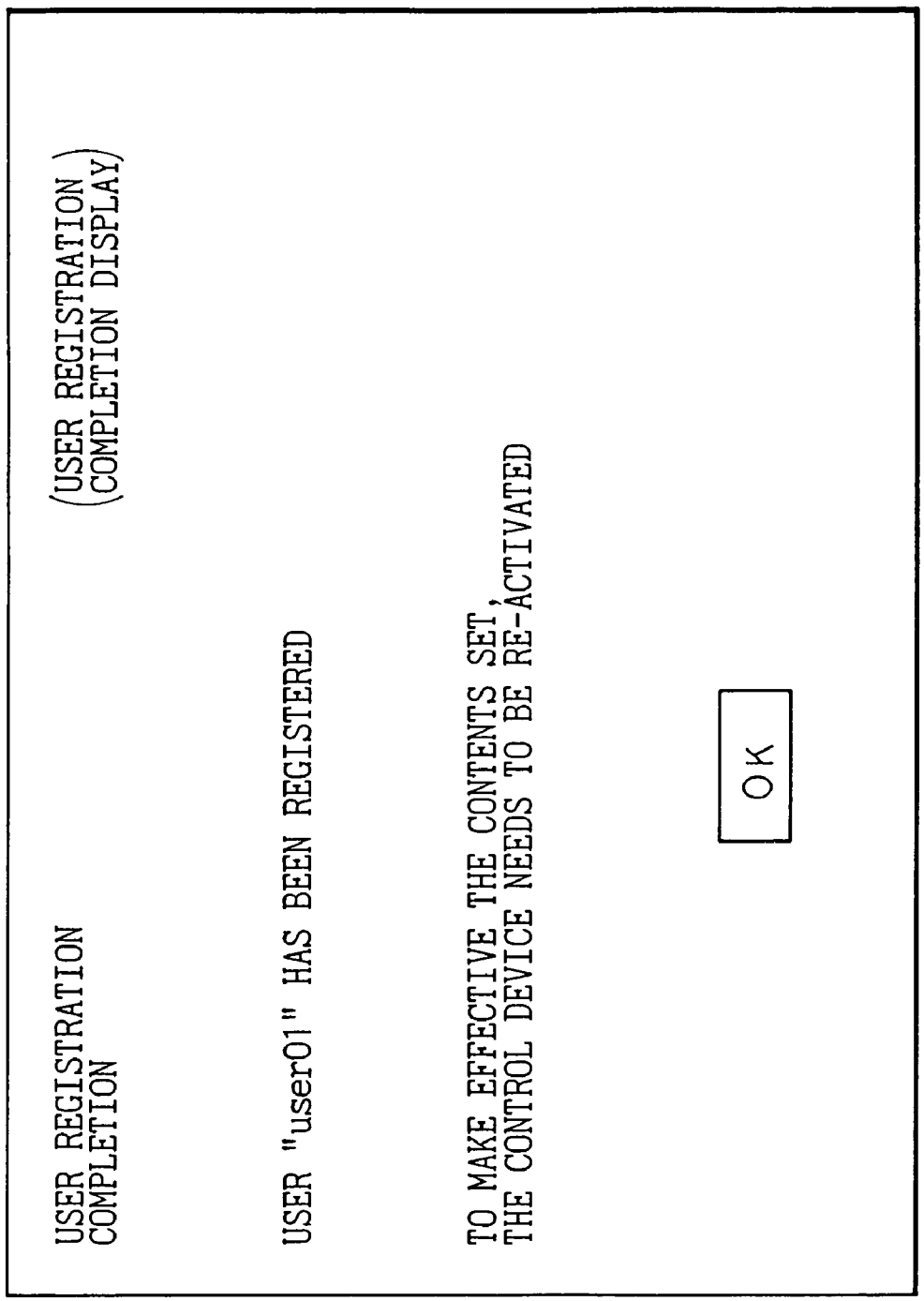

Here, when the operator presses a "registration" button after he or she has entered a user name and a password and entered again the password, the screen changes to a registration completion display shown in FIG. 2E, and a required message such as "the user name "user01" has been registered" is displayed. The new user is registered on the controller 1 through the operations of the operator described above, and from then on, the page printer system can be used with the user name so registered.

FIG. 3 shows the state of the CGI script in the controller 1 which functions as a server. As shown therein, the CGI script receives input information inputted from the Web page of the client, analyzes it and activates a processing program required in accordance with the contents of the analysis. In addition, the CGI script also generates and processes an HTML document for informing the user of the results of the processing and outputs information thereon to the Web browser. Then, in the Web browser, the information is displayed on the Web page and when the operator performs the following operation, the process advances to the following step.

In the page printer described above, as described previously, the CGI script is integrally configured and it was not possible to modify only the display control of the Web page. To cope with this, a page printer system according to the present invention is configured such that a description only for a display control division of the Web page can be changed.

A mode for carrying out the present invention will be described with reference to the accompanying drawings.

A basic conceptual configuration according to an embodiment of the present invention will be described in FIG. 4. Additionally, a schematic configuration of a server for a page printer system adopting the basic conceptual configuration is shown in FIG. 5.

As shown in FIG. 3, in the prior art CGI script, the input analysis, execution of the processing program and display control are described in the state in which they are related to each other, but in the present invention, as shown in FIG. 4, display control files are configured so as to be formed separately from input analysis and execution of processing programs exclusively for display control with respect to Web pages.

A number of display control files are prepared so as to correspond to respective Web pages. Then, described in each display control file are the name of processing program, information displayed on the screen, information linked to a display and the like.

An operation will be described with respect to a case where a display control file corresponding to a Web page shown in FIG. 4 is applied to a server for a page printer system shown in FIG. 5.

As shown in FIGS. 2A to 2E, when the operator makes selections following an operation menu displayed on each of the Web pages, information is inputted from a Web browser 2 on a client side, or the name of a display control file for executing the menu is sent to a server 1, and the operator can access a CGI script 12 via a WWW server 11 in the server 1. Then, a CGI interpreter 13 of the server 1 refers to a relevant display control file among a group 14 of display control files stored within the server 1 from the name of the display control file given from the client 2 side and starts analyzing the same. Then, required commands are executed and the results of the executions are sent to a Web page that is to be displayed on the screen of the client 2.

The display control file exists for each Web page and each file describes information required for the display of a related page. The respective display control files is constituted by a file control division and an HTML division which are separated from each other.

Here, FIG. 6 shows an example of a specific configuration for the display control.

A unique script is described in the file control division for commands on the relative Web page that are to be processed within the server 1 and page information to be displayed, in response to various situations, which is to be linked to next.

FIG. 6 shows an example of a unique script which is described in the file control division. (a) describes a command name, and, based upon the command name, a command to be processed by the server is issued. (b) describes a switch control that is to be linked to another display control file, whereby a display control described under (c) is executed. In the example shown, it is designated that a file name described at 1 or 2 under (C) is referred to with a value of a variable of $NPS-CMD-1. (d) describes that a display control file is to be executed which is designated for an abnormal termination of an issued command, and when this is outputted, the process does not advance to the HTML division.

Although it is not defined in the file configuration shown in FIG. 6, as in the case of a specific description example of a display control file for user registration shown in FIG. 10, in reality, comment statements such as a display control file name are described in the first three lines. A "#" is affixed to the head of the respective lines. Lines to which the "#" is affixed have nothing to do with execution. Then, there follows an "authorize" field designating an authorization check. This field describes to check if the operator has an executing authorization.

On the other hand, an HTML tag for basically displaying a relevant page, a JavaScript, is described in the HTML division. (e) describes that an HTML to be displayed is selected depending on a value, and it is designed that a statement corresponding to the value is referred to from HTMLs described at (f).

For example, in the case of a display control file for displaying a user registration completion display shown in FIG. 2E, an entered user name like "user01" needs to be displayed. A portion corresponding to "user01" in the message is dynamic information. FIG. 10 shows a specific description example in which the dynamic information needs to be embedded.

In a display control file related to displaying the user registration completion display shown in FIG. 10, an HTML division is described after a file control division, and general HTML statements are described in the HTML division. Among them there is described a line to the head of which a "$" is affixed. The reference symbol "$" denotes that a portion needing to be replaced, i.e., a variable, is included in the description of the line.

In the example shown in FIG. 10, a case is shown in which a statement, "a user "user01" has been registered", is displayed in the user registration completion display. In this statement, the "user01" is dynamic information, and it is optionally entered by the user. Then, the "$NPS-CGI-u$" is described as a variable in the portion where the "user01" is described so that the "user01", the dynamic information, can be embedded. Here, the "$" is affixed to before and after the variable so as to denote that the portion designated by them is a variable. The CGI interpreter 13 identifies from the "$" so affixed that the description portion is a variable. Although it is possible to execute even if no "$" is affixed to the head of the line, with the "$" being affixed to the head as well, the processing speed can be improved.

The CGI interpreter 13 analyzes the description of a line to which the "$" is affixed and identifies a variable portion. Then, following the description of "$NPS-CGI-u$", the "user01" entered by the user and stored in a portion corresponding to a parameter u is read out. Next, the CGI interpreter 13 creates an HTML for the "user01" and embeds it in the contents of a message described in an HTML division. Then, the message in which the dynamic information is embedded is outputted to the Web browser 11.

Thus, it is possible to describe a message to be embedded with dynamic information as well as a general HTML.

As has been described heretofore, the display control file is described separately in the file control division and the HTML division, and written codes are described separately in a text format for each line.

Destinations to which respective pages are linked are realized by passing display control file names as parameters to the CGI script. In addition, the interpreter of the CGI script converts information that dynamically changes within a page into information to be displayed by using a unique status variable and script at the time of execution.

The CGI script analyzes the display control files described above and issues, as commands, operations needed, and the HTML and JavaScript described at the HTML division are outputted to the Web browser depending on the condition of execution for display.

The Web display control and the CGI script can be separated by configuring the display control files as described above, and since a reference is designed to be made from the display control files through I/Fs which are commands, even if the specification of a processing program is changed, nothing is affected thereby. In addition, even when looked at from the processing program side, since there is no need to be aware of the Web display control, even when the display specification such as a display design is changed, nothing is affected thereby.

Next, the operation of the interpreter 13 at the CGI script 12 will be described by using the display control files described above while referring to a process summary shown in FIG. 7 and process flows shown in FIGS. 8 and 9.

Figure 7:
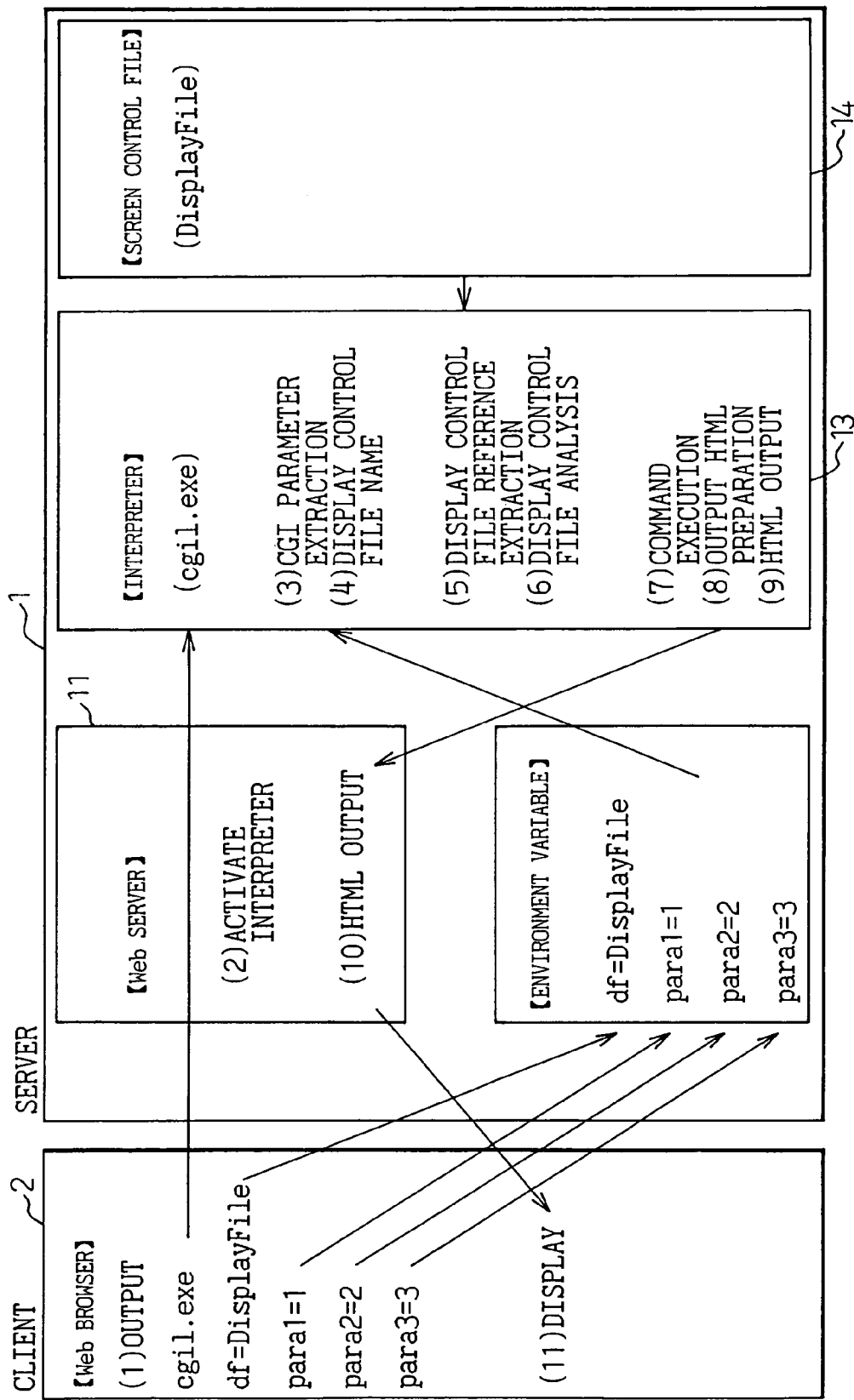
FIG. 7 is a diagram briefly explaining the processing by the server in the embodiment of the present invention.

A server 1 shown in FIG. 7 comprises a Web server division, a CGI interpreter division 13, a display control file division 14 and an environment variable division. Here, the relationship between the display control file division 14 and the interpreter division 13 will mainly be described, and an additional control division for functioning as a server is omitted.

Assume that the operator clicks on an operation menu for a Web page displayed on the Web browser on the screen of an operation terminal unit 2 which is a client. Then, prepared on the client side following what is entered by the operator are a command for activating the interpreter and a CGI parameter for a display control file corresponding to the entered operation menu, which are then outputted to a Web server of the server 1 (1).

When the Web server accepts the command for activating the interpreter and the CGI parameter from the client side, the Web server activates the interpreter by following the command (2). At the same time as this, the CGI parameter is written in the environment variable division.

Figure 8:
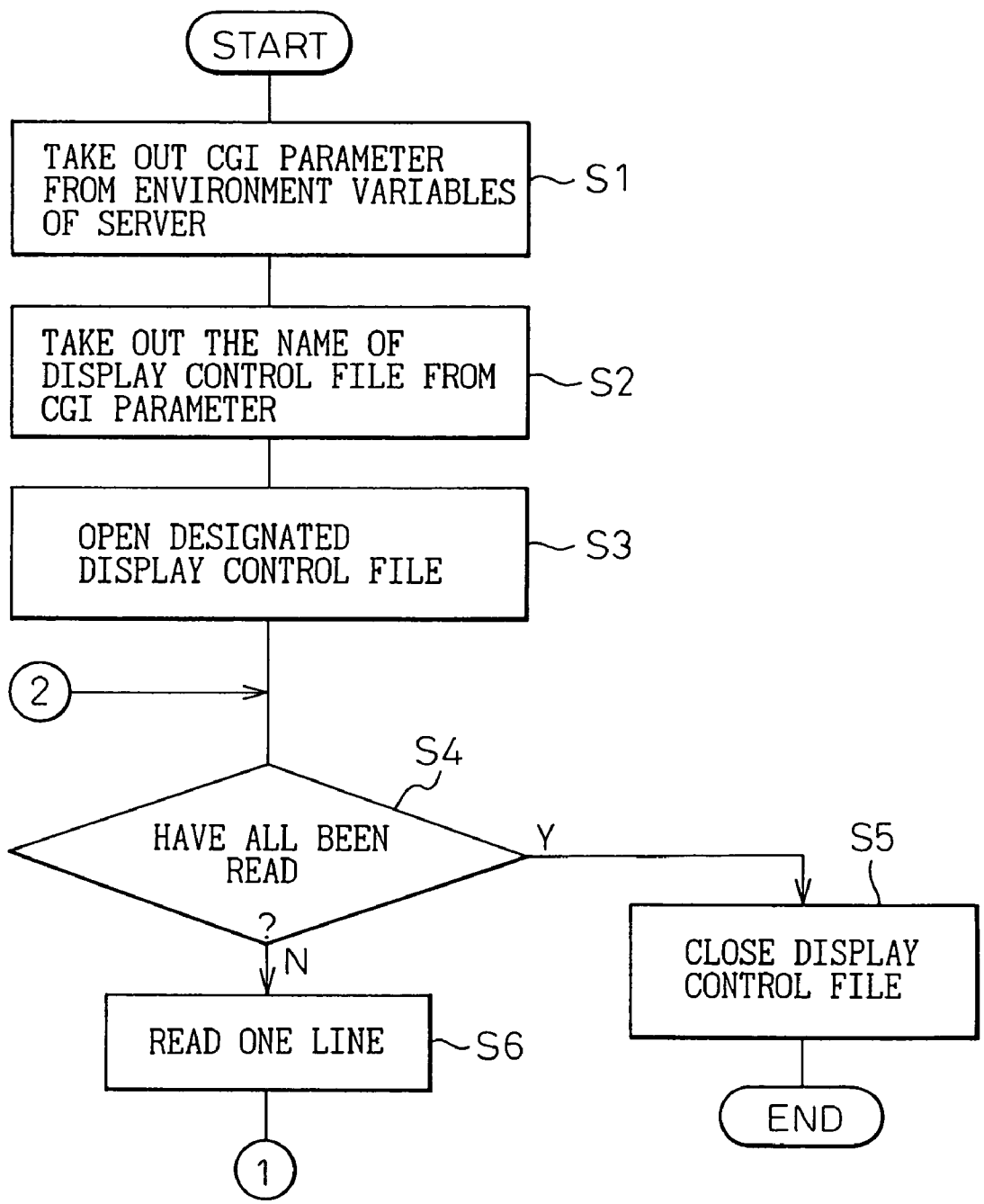
FIG. 8 is a flow chart showing the processing by a CGI interpreter of the server according to the embodiment of the present invention.
Figure 9:
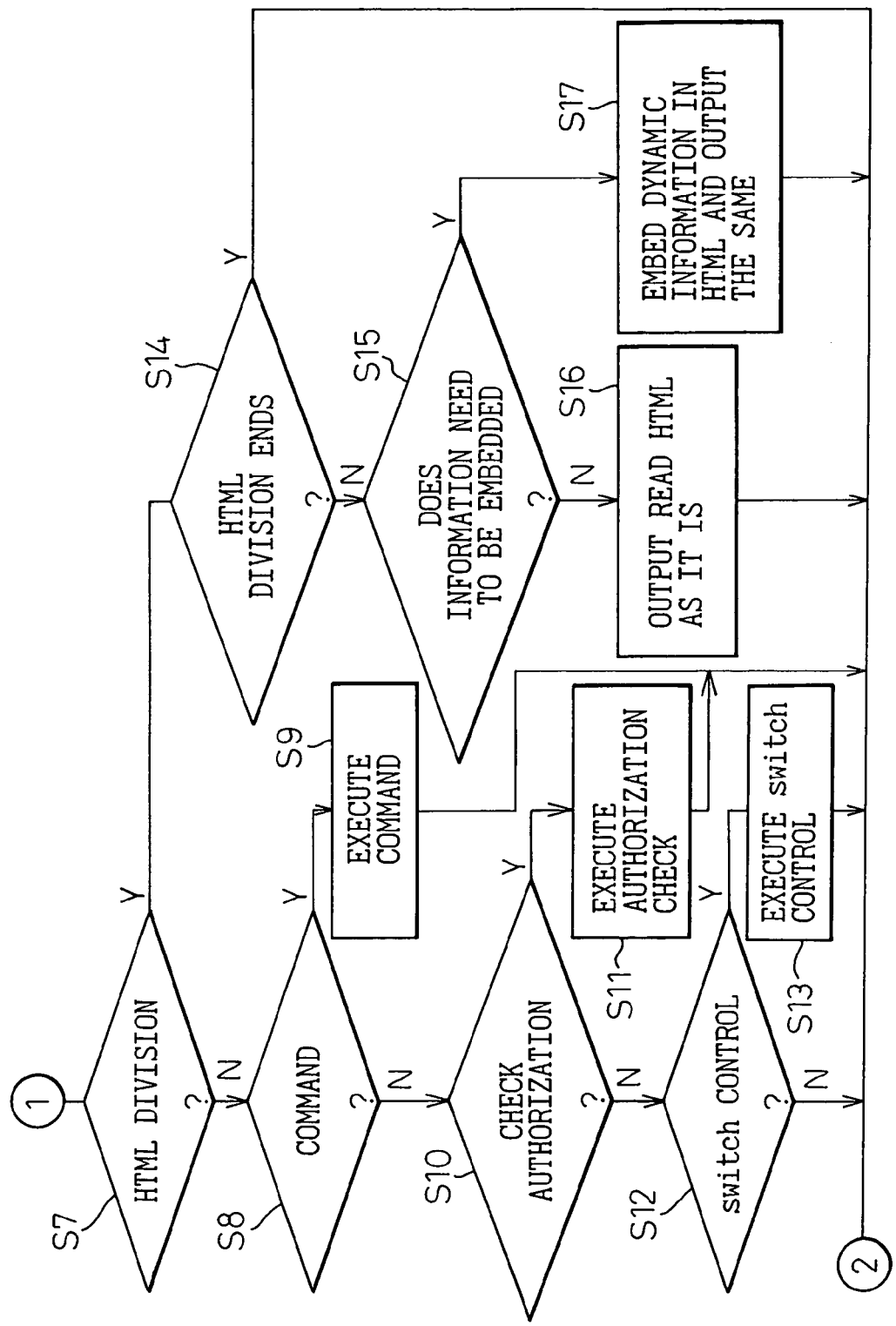
FIG. 9 is a flow chart showing the processing by the CGI interpreter of the server which follows FIG. 8.

Here, when the interpreter is activated, the process flow shown in FIG. 8 is initiated. In Step S1, first the interpreter takes out the CGI parameter from the environment variable division of the server (3), and following this, in Step S2, the name of a display control file is extracted from this parameter (4). Then, in Step S3, the display control file is opened based on the name of a display control file so extracted (5).

The display control file so opened is then analyzed (6). As shown in FIG. 6, the display control file is described in the text format separately in the file control and HTML divisions line by line. Then, in Step S4, whether or not an analyzing process has been completed for all the lines described in the display control file is checked.

Here, if all the lines described in the display control file have been read in for analyzing process (Y), then the process advances to Step S5, where the analyzing process is completed by closing the display control file which is then open.

On the contrary, if all the lines described in the display control file have not yet been read in (N), first, a line described in the display control file is read (Step S6). If it is described in the text format, a portion continuing to where a line feed mark is provided is read as a line.

In analyzing the display control file with the interpreter, the lines described in the file are to be read sequentially line by line from the head line in the file. Then, first reading is started with the file control division, and whether the reading of the HTML division has been started or not is determined (Step S7).

Here, in the event that the line read is still a part of the file control division (N), whether or not the description in the line is a command is determined (Step S8).

In reality, as shown in FIG. 10, comment statements such as the name of the display control file are described in the first three lines. Then, described next is an authorization check. Furthermore, for example, in the case of a display control file related to the operations shown in FIGS. 2A to 2E, a command for user registration is described as shown at (a) in FIG. 6 and FIG. 10.

When the file control division is described as shown, since the first line is not a command (N), the process advances to Step S12, but since the first line is not a switch control, nor (N), then the process returns to Step S4, where the following line is started to be read.

In the event that the file is configured as described in FIG. 10, since the description in the fifth line is about the authorization check, then the process advances up to Step S10, and in Step S11, checking on whether there has been given an authorization for access is executed, and then the process returns to Step S4, where the following line is started to be read.

Then, in the event that the read line is the user registration command as shown at (a) in FIG. 6 and in the seventh line in FIG. 10, in Step S8, the description in question is determined as a command (Y), and in Step S9, the command is executed (as shown at (7) in FIG. 7). When the command has been executed, then the process returns to Step S4, where the following line is read.

Then, since the read line designates a switch control as shown at (b) in FIG. 6, in Step S12, the line is determined as the switch control (Y), in Step S13, the switch control is executed based on a value described. When the execution is completed, the process returns to Step S4.

As shown in FIGS. 6 and 10, the HTML division is described following to the file control division in the display control file. Since a line read thereafter is then determined as one of the descriptions in the HTML division in Step S7 (Y), the process advances to Step S14.

Then, in Step S14, in the event that the description is determined as a description needing no dynamic information to be embedded (N), then the process advances to Step S16, where the interpreter outputs the HTML that it has read in as it is (9).

On the other hand, in the display control file shown in FIG. 10, as shown for example in FIG. 2E, the dynamic information on the "user01" needs to be embedded. Then, in Step S15, in the event that the description of the line so read needs such dynamic information to be embedded (Y), in Step S17, the dynamic information of the "user01" is embedded in an HTML (8), and the interpreter outputs the HTML that it has created for output (9).

Thus, in this way, the interpreter reads the descriptions on the display control file line by line from the beginning thereof, analyses the display control file and executes the commands or outputs the HTML that it has read or embedded therein. Then, in Step S4, in the event that the interpreter reads all the lines described in the display control file and completes the analysis thereof (Y), the process advances to Step S5, where the display control file is closed to end the process.

Then, the Web server receives the HTMLs from the interpreter and outputs to the Web browser of the client (10), where the output so outputted is displayed on the Web page (11).

As has been described heretofore, according to the present invention, in the server for the interactive system in which inputs are made through the Web browser and the processing of the inputs is carried out on the server side, the division related to the screen display and the division adapted to operate as the CGI script are separately configured, whereby the Web page control and CGI script can be executed through the passage of parameters. Then, in the event that the specification of the screen display is changed, the display control file will only have to be modified, and therefore no other processing programs are affected and, even if modifications are made at other locations, nothing is affected thereby.

According to the present invention, the source files for the Web display control division, the CGI script division and the processing program division are clearly separated and can be developed in parallel, and therefore, the development efficiency can be improved and the source management with a high maintainability is made possible, as a result of which the system quality is improved, and therefore the present invention contributes to end users.

What is claimed is:

1. A processor connected via a network system to an operation terminal in which inputs are made through a Web browser, the processor comprising:

an interpreter;

a plurality of processing programs; and a plurality of display control files which are provided for each web page and in which a processing program to be executed and an HTML tag for displaying a result of executing the processing program are described separately; wherein the interpreter interprets a CGI script according to a request from the operation terminal, specifies a display control file which is designated through the web browser by using a parameter designated by the operation terminal, executes a processing program which is described in the specified display control file, and outputs a display control information based on the HTML tag of the specified display control file and result of the processing.

2. A processor as set forth in claim 1, wherein, in the display control file, the display control information is described separately in a file control division and an HTML division.

3. A processor as set forth in claim 1, wherein the interpreter reads the display control information for each line and executes an analyzing process.

4. A processor as set forth in claim 2, wherein the interpreter embeds, based on the description of the HTML division, dynamic information related to the display of the Web page in HTML output and outputs the HTML output.

* * * * *